Oct. 2, 1928.
E. F. PAWSAT
BICYCLE REPAIR PLATE
Filed Sept. 29, 1926
1,685,882
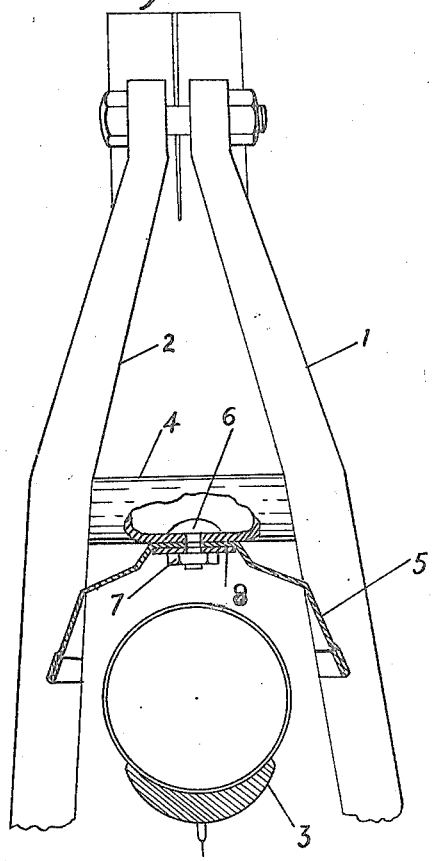
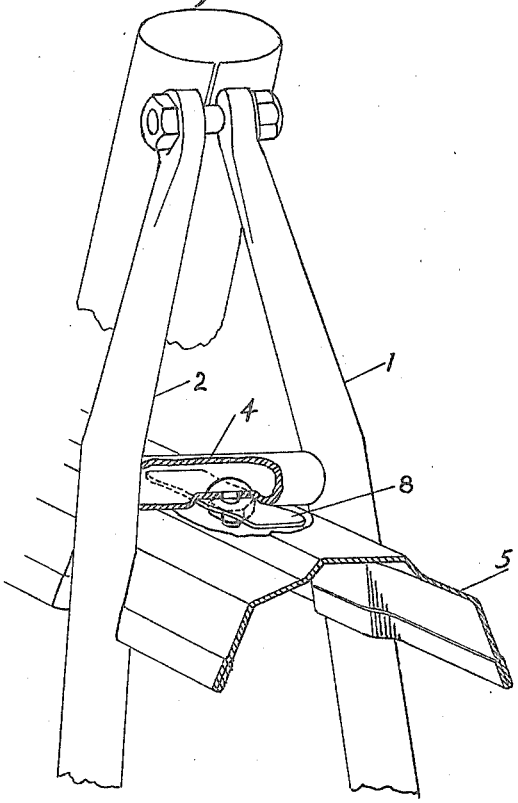
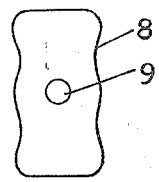
Inventor.
Ewald F. Pawsat,
By Arthur H. Ewald,
Attorney.

Patented Oct. 2, 1928.

1,685,882

UNITED STATES PATENT OFFICE.

EWALD F. PAWSAT, OF MAYSVILLE, KENTUCKY, ASSIGNOR TO WALD MANUFACTURING COMPANY, A CORPORATION OF KENTUCKY.

BICYCLE REPAIR PLATE.

Application filed September 29, 1926. Serial No. 138,523.

My invention relates to plates for the repair of bicycles.

The principal object of the present invention is to provide a simple and effective plate whereby repairs may be readily made when the mud-guard of a bicycle becomes loosened from the frame or other support therefor.

Bicycle mud-guards are secured to the frames or supporting brackets of the bicycle by means of bolts or rivets which extend through perforations in the mud-guards. By reason of the continued vibration resulting from use, or other cause, it frequently happens that the mud-guard becomes loose and often entirely detached by reason of the wearing of the hole through which the bolt or rivet extends. It is to provide means for a ready repair of a difficulty of this nature that the present invention is principally directed.

A further object of the invention is to provide a repair plate of the character mentioned, by the use of which the parts repaired will be rigidified and strengthened so as to be virtually as strong as, if not stronger, than when new.

Further objects of the invention will appear from the following detailed description thereof.

In the drawings:

Figure 1 is an elevation of a portion of a bicycle showing the mud-guard and attaching parts in section.

Figure 2 is a perspective of the parts illustrated in Figure 1, parts being broken away to illustrate the method of making repairs with my new repair plate.

Figure 3 is a plan view of the repair plate.

The numerals 1 and 2 indicate the fork members or rods of a bicycle between which the wheel 3 is mounted. The numeral 4 indicates a tubular cross-brace between the rods 1 and 2 to which the mud-guard 5 is secured in the usual manner by means of a bolt 6 and a nut 7 or other suitable device.

The numeral 8 indicates an elongated plate, preferably of the shape illustrated in Figure 3, said plate being provided with a central hole 9 adapted for the passage of the bolt 6. The plate is adapted to be inserted on the inside of the mud-guard around the bolt 6 and to be secured by means of the nut 7, as shown in Figures 1 and 2. When thus secured it will be seen that it securely clamps the mud-guard and operates as a repair and re-inforcement plate or member so as to reassemble and rigidify the parts.

From the foregoing description the nature and value of the present invention will be apparent to those skilled in the art to which the same appertains. When, by reason of the vibrations of use or because of accident, the mud-guard 5 is torn loose from the bolt 6, the plate 8 is inserted in the inside of the mud-guard, as shown in Figures 1 and 2, and secured by means of the nut 7. When the parts are thus assembled it will be seen that an effective and rigid repair will be made at a minimum of expense both in financial outlay and time.

It will be understood that various modifications may be made in the construction of repair plates in accordance with this invention without departing from the scope thereof as defined in the appended claim.

Having thus fully described by invention, what I claim as new and desire to secure by Letters Patent is:

As an article of manufacture, an elongated repair plate, said plate being shaped to rest longitudinally against a bicycle mud guard, and having a central perforation to receive the mud guard attaching bolt.

EWALD F. PAWSAT.